US008892963B2

(12) United States Patent
Macri et al.

(10) Patent No.: US 8,892,963 B2
(45) Date of Patent: *Nov. 18, 2014

(54) ERROR DETECTION IN HIGH-SPEED ASYMMETRIC INTERFACES UTILIZING DEDICATED INTERFACE LINES

(75) Inventors: Joseph Macri, Sunnyvale, CA (US);
Stephen Morein, Sunnyvale, CA (US);
Claude Gauthier, Sunnyvale, CA (US);
Ming-Ju E. Lee, Sunnyvale, CA (US);
Lin Chen, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/595,619

(22) Filed: Nov. 9, 2006

(65) Prior Publication Data
US 2007/0104327 A1    May 10, 2007

Related U.S. Application Data

(60) Provisional application No. 60/735,731, filed on Nov. 10, 2005.

(51) Int. Cl.
*G06F 11/00* (2006.01)
*H04L 1/00* (2006.01)
*G06F 11/10* (2006.01)
*G06F 11/08* (2006.01)

(52) U.S. Cl.
CPC ............ *H04L 1/0045* (2013.01); *H04L 1/0061* (2013.01); *H04L 2001/0094* (2013.01); *G06F 11/10* (2013.01); *G06F 11/08* (2013.01)
USPC ................. 714/49; 714/52; 714/18; 714/758; 711/133

(58) Field of Classification Search
USPC .......................... 714/52, 758, 18, 49; 711/133
See application file for complete search history.

(56) References Cited

U.S. PATENT DOCUMENTS 5,745,502 A * 4/1998 Khayrallah et al. .......... 714/751
5,754,754 A * 5/1998 Dudley et al. .................. 714/18

(Continued)

FOREIGN PATENT DOCUMENTS

GB          2313747  A       12/1997

OTHER PUBLICATIONS

PCI-Sig (PCI Local Bus Specifications) Feb. 2004, Revision 3, p. 1-344.*

(Continued)

*Primary Examiner* — Joshua P Lottich
*Assistant Examiner* — Jeison C Arcos
(74) *Attorney, Agent, or Firm* — Volpe and Koenig, P.C.

(57) ABSTRACT

A system and method for detecting errors in high-speed asymmetric interfaces are described. Embodiments include transmitting digital data between a first system component and a second system component over a bidirectional interface, wherein the first component is significantly more intelligent than the second component. The first component receives a signature from the second component over a line of the interface concurrent with READ and WRITE operations over the interface. The latency associated with transmission of a signature from the second component to the first component is the time taken for the second component to compute a signature. The signature received is compared to a signature stored by the first component. Both signatures correspond to a particular READ or WRITE command. Based on the comparison, the first component determines whether the READ or WRITE operation was successful, and directs the second component as necessary.

38 Claims, 4 Drawing Sheets (56) References Cited

U.S. PATENT DOCUMENTS

| | | | | |
|---|---|---|---|---|
| 6,014,767 | A * | 1/2000 | Glaise | 714/776 |
| 6,327,688 | B1 | 12/2001 | Stolitzka et al. | |
| 6,760,814 | B2 * | 7/2004 | Corrigan | 711/133 |
| 6,938,188 | B1 * | 8/2005 | Kelleher | 714/43 |
| 2002/0188907 | A1 * | 12/2002 | Kobayashi | 714/758 |

OTHER PUBLICATIONS

Texas Instruments, (Inter-Intergrated Circuit Module Reference Guide) Nov. 2004, p. 1-36.*

Phillips, (The I2C Bus specifications) Jan. 2000, Version 2.1, p. 1-46.*

Phillips, "PCF8584 I2C Bus Controller", Feb. 10, 1997, Phillips semiconductors, p. 1-40.*

Zwart, "How to connect the I2C-Bus from Service-box to Front-End Modules", 2003, National Institute for Nuclear and High Energy Physics, pp. 1-5.*

Philips, "I2C-bus autosync deflection controller for PC/TV monitors", 1999, Philips, pp. 1-59.*

Awart, "How to connect the I2C-Bus from Service-box to Front-End Modules", Mar. 2003, NIKKEF, pp. 1-5.*

Form PCT/ISA/220, "PCT Notification of Transmittal of the International Search Report and the Written Opinion of the International Searching Authority, or the Declaration," 2 pgs, Oct. 2006.

Form PCT/ISA/210, "PCT International Search Report," 4 pgs, Oct. 2006.

Form PCT/ISA/237, "PCT Written Opinion of the International Searching Authority," 11 pgs, Oct. 2005.

* cited by examiner

ERROR DETECTION IN HIGH-SPEED ASYMMETRIC INTERFACES UTILIZING DEDICATED INTERFACE LINES

CROSS-REFERENCE TO RELATED APPLICATIONS

The current application claims the benefit under 35 U.S.C. §119(e) of Provisional Application No. 60/735,731, entitled "Error Detection in High-Speed Asymmetric Interfaces," and filed on Nov. 10, 2005.

FIELD

Embodiments of the invention relate generally to data transfer in computer and other digital systems, and specifically to error detection in data transfer interfaces.

BACKGROUND

As computer and other digital systems become more complex and more capable, methods and hardware to enhance the transfer of data between system components or elements continually evolve. Data to be transferred include signals representing data, commands, or any other signals. System components or elements can include different functional hardware blocks on a single integrated circuit (IC), or on different ICs. The different integrated circuits may or may not be on the same printed circuit board (PCB). System components typically include an input/output (I/O) interface specifically designed to receive data from other system components and to transmit data to other system components.

One consistent trend as computing systems become more capable is an increase in the amount of data to be transferred per time period. Some applications that require high data rates include game consoles, high definition television (HDTV), personal computer (PC) main memory, graphics processors, and various consumer devices not already mentioned. In response to the demand for increased data rates, double data rate (DDR) standards have been developed to standardize the behavior of hardware and software using high data rates. Several generations of graphics DDR (GDDR) standards have been developed specifically for graphics processing and video processing, which typically demand the capability to transfer and process very large amounts of data.

In some instances, conventional methods for handling well-known digital data transfer issues become impractical or unworkable as data rates become higher. For example, it is known that digital data transmission experiences errors. That is, signals will be incorrectly interpreted as having an incorrect binary value for a variety of reasons. Errors are quantified as an error rate, which can be a number of errors per unit time, or a number of errors per some number of transmissions. In response to the reality of errors in digital data transmission, schemes for error detection and/or correction were developed. One common approach is error checking and correction (ECC), which is a collection of methods to detect errors in transmitted or stored data, and to correct them. This is done in many ways, all of them involving some form of coding. The simplest form of error detection is a single added parity bit or a cyclic redundancy check. Multiple parity bits can detect not only that an error has occurred, but also which bits have been inverted, and should therefore be re-inverted to restore the original data. The greater the number of extra bits that are added, the greater the chance that multiple errors will be detectable and correctable.

Conventional methods such as ECC are generally not practical for DDR interfaces. One reason is that in many DDR applications, the most likely errors are multi-bit errors (affecting more than one bit in a word) that are due to noise or timing issues. ECC is not well adapted to detect and correct such multi-bit errors.

Another reason conventional methods such as ECC are not practical for DDR interfaces is that ECC requires extra pins for parity bits. Additional pins for error detection may also be multiplied further when one system component, such as a processor, must interface with many other components, necessitating error detection and correction for each data path. Probably without exception, it is desirable to maintain as low a pin count as possible in modern mass-produced systems. Therefore, adding pins to handle errors is not a good solution, especially when even more pins may be required in high data rate systems (as compared to lower data rate systems) to provide acceptable error detection and correction.

Another approach to error detection according to various communication standards includes sending a signature with data from the sender to the receiver. The receiver compares the signature with the correct signature, and if there is an error, the sender is asked to retry. Some of the disadvantages associated with present signature-based approaches in many common high data rate applications include the length of time required to perform the comparison and request a retry, as well as the amount of intelligence required to be present on both the receiver and transmitter. In many high data rate applications, the requisite amount of intelligence is not often present. For example, many high speed memories include a minimum of intelligence and are controlled by memory controllers that handle as many logic functions as possible for one or memories under control. Having memories with minimal intelligence, or logic on board, reduces memory cost (a significant portion of system cost) and increases interface flexibility.

Another way to method for reducing errors is to run the system at a slower data rate, but this approach harms the very performance that is usually a goal to be achieved by higher data rates.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a system and method for error detection in high-speed asymmetric interfaces are described herein. In one embodiment, a signature, such as a checksum or cyclic redundancy check (CRC), is computed by both a more intelligent, controller sender/receiver and a less intelligent, controlled sender/receiver. The signatures are computed for each READ or WRITE command issued. The signatures for each READ or WRITE command are compared at the controller sender/receiver and the controller sender/receiver takes any action necessary, including providing direction to the controlled sender/receiver if the signatures do not match. In order for the comparison to take place, the controlled sender/receiver sends its computed signature to the controller sender/receiver using existing transmission paths. In one embodiment, the existing transmission paths include pins and paths of the sender/receiver interface that are separate from the data pins and address/command pins, such that a signature can be transmitted concurrently with READ or WRITE data during respective READ and WRITE operations.

Figure 1:
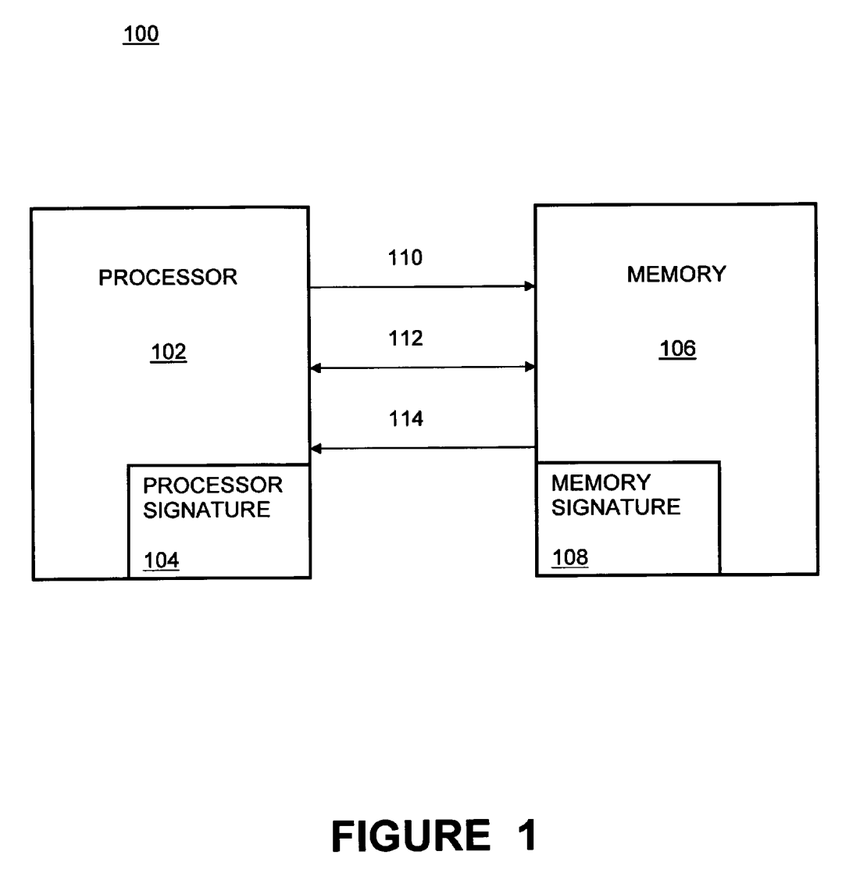
FIG. 1 is a block diagram of a digital system that implements an error correction system, according to an embodiment.

FIG. 1 is a block diagram of components 100 of a digital system according to an embodiment. Components 100 include a more intelligent, controller sender/receiver 102 and a less intelligent, controlled sender/receiver 106. In one embodiment, component 102 is a processor, including a central processing unit and any sub-processor or special purpose processor such as a graphics processor. Component 106 includes one or more memory components in an embodiment, including for example, dynamic random access memory (DRAM), or DDR DRAM. In other embodiments, the more intelligent, controller sender/receiver 102 and the less intelligent, controlled sender/receiver 106 may be other kinds of components. The terms memory and DRAM are both used herein. In general, however, a memory component, including a DRAM, is just an example of a less intelligent, controlled sender/receiver.

In various embodiments, the processor 102 is a client of the memory 106, and provides many logic functions for controlling the operation of the memory 106. In an embodiment, the processor 106 includes a memory controller component, or some other specialized logic for this purpose, but embodiments are not so limited.

Each of the processor 102 and the memory 106 include a respective signature (SN) register. The processor 102 includes a signature register 104 and the memory 106 includes a signature register 108. Each register 104 and 108 can represent a memory location within the respective processor that is configured to temporarily or permanently hold a signature value. A bidirectional digital communications channel, or interface, or bus, between the processor 102 and the memory 106 includes address/command lines 110 and data lines 112. In general, command lines 110 transmit access commands such as READ or WRITE commands, among others, from the processor 102 to the memory 106. In response to these commands, the memory 106 sends or receives the data over data lines 112.

The interface also includes unidirectional lines 114. The lines 114 can carry information from the memory 106 to the processor 102 concurrent with the transfer of commands and data over lines 110 and 112, respectively. This facilitates the control of memory 106 functions by the processor 102. For example, lines 114 can carry memory clock phase information to the processor 102 so that the processor 102 can manage clock phase adjustment for the memory 106. Lines 114 can also carry mask bits that provide additional functionality or enhance existing functionality. Lines 114 in various embodiments may be dedicated to the functions described herein, such as carrying memory signature information 108 to the processor 102. Lines 114 can alternatively be shared between the signature carrying function and other functions outside of data, address, and command transmission.

In one embodiment, the interface between the processor 102 and the memory 106 is a DDR, 32-bit interface. In one embodiment, data is transferred between the processor 102 and 106 through a series of memory READ and WRITE operations. In general, data is stored in memory 106 through WRITE operations issued by the processor 102, and stored data is accessed by processor 102 through READ operations. The size of these operations generally depends on the size of the interface. For example, READ and WRITE operations may entail burst transmissions of 8 transmissions per burst. For a 32-bit interface then, a burst is 256 bits per transmission.

As further described herein, the processor 102 and the memory 106 each compute signatures associated with a series of READ or WRITE operations. The signatures computed by each of the processor 102 and the memory 106 match if the data was accurately transmitted and received, that is, if the READ or WRITE operation was successful. In various embodiments, the memory 106 computes a signature, and transfers the signature from the signature register 108 to the processor 102 for comparison with the signature in the signature register 104.

In general, the signature can be any type of digital value that can be generated and stored in a register associated with each of the processor 102 and memory 106. In one embodiment, the signature is a checksum comprising a small, fixed number of bits produced by a CRC (cyclic redundancy check) process, or similar hash function. In general, the CRC signature is computed and appended before transmission or storage, and verified by the recipient after reception to confirm that no changes occurred in transit. Any change in the signature indicates the presence of errors due to factors, such as noise in the transmission channels. The signature registers 104 and 108 that store the processor and memory signatures can be any memory location or register(s) within the respective devices that is of sufficient size to store the signature values.

In one embodiment, a signature is computed for each 256-bit (burst of 8 transmissions) transfer. For this embodiment, the lines 114 include one line per 8 data bits, and an 8-bit signature is computed from 64 bits of signature data. In another embodiment, the lines 114 include one line per 16 data bits, and a 4-bit signature is computed from 64 bits of signature data. Alternatively, the line 114 includes one half shared line per 8 data bits, and a 4-bit signature is computed from 64 bits of signature data. Other variations in line width and data transmission are also contemplated.

Various ways of computing the signature are possible within the scope of the embodiments described. For example, in an embodiment, the signature is computed by processing the data on the data lines 112 using a form of CRC or a form of parity check. The computation can include a conversion of 64 bits (a burst of 8 multiplied by 8 bits per line) to an 8-bit CRC value (signature) that is then sent serially on the lines 114 after some number of cycles of delay due to the computation time.

As soon as a memory signature is computed, it is transferred to the processor 102. The delay due to computation time may be, for example, one or two cycles. In one embodiment, the transfer of the signatures occurs two burst transmissions after the first burst transmission of the transaction, but embodiments are not so limited.

Figure 2:
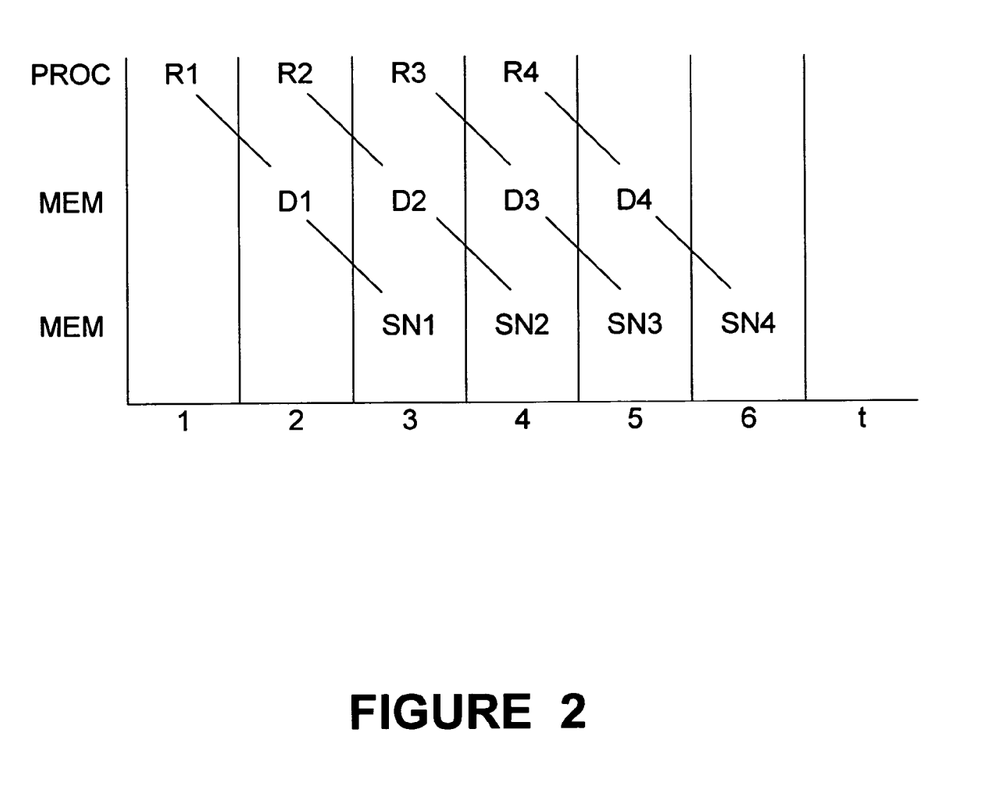
FIG. 2 is a diagram illustrating transmissions on a processor-memory interface, according to an embodiment.

FIG. 2 is a timing diagram that illustrates transmissions on the interface between the processor 102 and the memory 106 according to an embodiment. On the horizontal axis, reference numbers 1-6 refer to time slots on the interface. On the vertical axis, "PROC" indicates commands sent by the processor, and "MEM" indicates transfers by the memory to the processor. Each of time slots 1-6 accommodates a burst transmission as previously described. In time slot 1, the processor issues a READ command R1. In time slot 2, the processor issues a READ command R2. In time slot 3, the processor issues a READ command R3. In time slot 4, the processor issues a READ command R4.

In time slot 2, the memory transmits data D1 in response to R1. In time slot 3, the memory transmits data D2 in response to R2. Also in time slot 3, the memory transmits data signature SN1 in response to R1. In time slot 4, the memory transmits data D3 in response to R3. Also in time slot 4, the memory transmits data signature SN2 in response to R2. In time slot 5, the memory transmits data D4 in response to R4. Also in time slot 5, the memory transmits data signature SN3 in response to R3. In time slot 5, the memory transmits data D4 in response to R4. Also in time slot 6, the memory transmits data signature SN4 in response to R4. If any transmitted signature (SN1-SN4) does not match the corresponding signature stored by the processor, then the particular READ operation referred to is invalidated. The processor takes any action that is appropriate, such as retrying the operation, ignoring the operation, aborting the operation, and so on.

Figure 3:
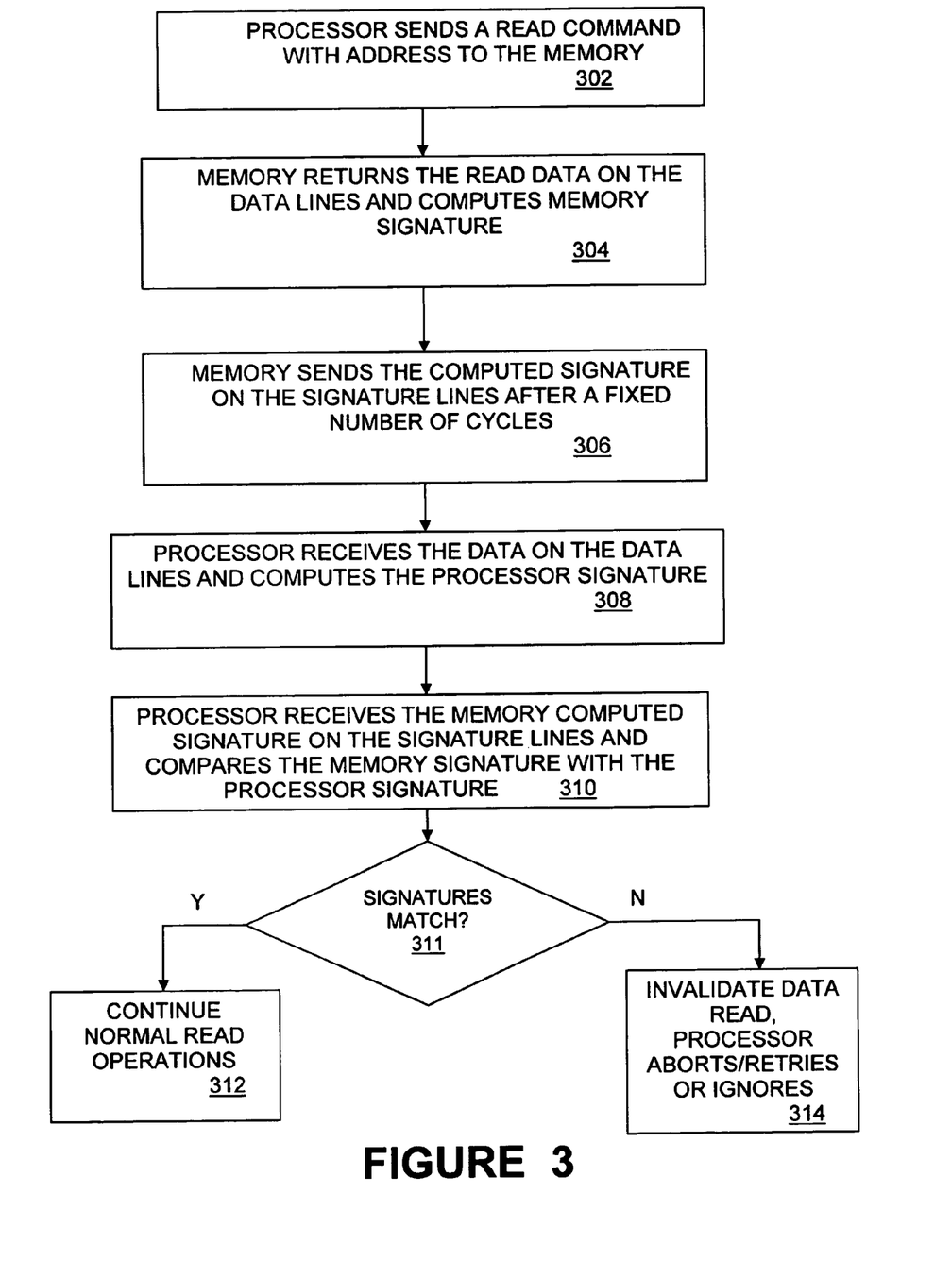
FIG. 3 is a flow diagram of a method for detecting errors during READ operations, according to an embodiment.
Figure 4:
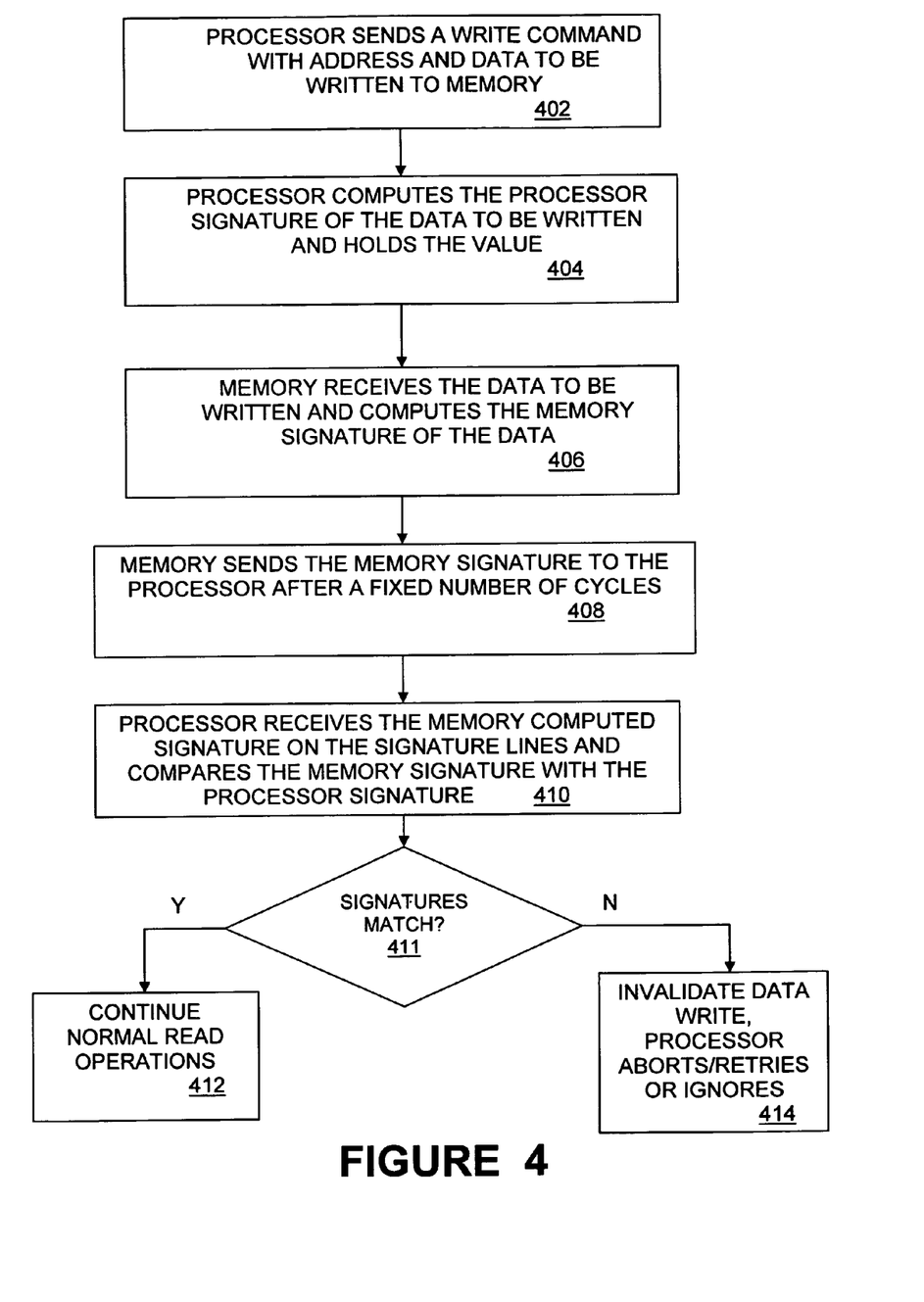
FIG. 4 is a flow diagram of error detection during WRITE operations, according to an embodiment.

FIG. 2 illustrates an embodiment of error detection for READ operations. Embodiments of error detection for WRITE operations are similar. FIGS. 3 and 4 are flow diagrams of methods for READ and WRITE operations, respectively.

FIG. 3 is a flow diagram of a method for detecting errors during READ operations according to another embodiment. At 302, the processor sends a READ command to the memory, along with the memory address to be accessed. The memory returns the READ data on the data lines and computes memory signature at 304. The memory sends the computed signature on the signature lines after a fixed number of clock cycles at 306. At 308, the processor receives the data on the data lines and computes the processor signature. The processor then receives the memory's computed signature on the signature lines, and compares the memory signature with the processor signature at 310.

In block 311 it is determined whether or not the two signatures match. If the two signatures match, normal READ operations are continued at 312. If the two signatures do not match, as shown at 314, the particular READ operation related to the signatures is invalidated, and the processor, takes appropriate action, such as a retry, ignore, abort, and so on.

FIG. 4 is a flow diagram of error detection during a WRITE operation, according to an embodiment. The processor sends a write command to the memory, along with the address and the data to be written to the memory at 402. At 404, the processor computes the processor signature of the data to be written and holds this value in the processor signature register. At 406, the memory receives the data to be written, and computes the memory signature of the received data. The memory then sends the memory signature to the processor at 408, after a fixed number of cycles. The processor receives the memory's computed signature on the signature lines at 410, and compares the memory signature with the processor signature. In block 411 it is determined whether or not the two signatures match. If the two signatures match, normal WRITE operations are continued at 412. If the two signatures do not match, as shown at 414, the particular WRITE operation related to the signatures is invalidated, and processor takes appropriate action (retry, ignore, abort, etc.).

In general, the error detection system and method according to embodiments utilizes a signature value that is calculated at a first component based on the composition of data that is to be sent to a second component. Upon transmission of the data and a target address from the first component to the second component, the second component then calculates a signature value based on the composition of the received data. The first component then sends its signature value to the second component, which then compares the two signature values. If the signature match, the received data is correct. If the signatures do not match, the received data is contains errors. In a memory controller system, the first component could be a memory device and the second component could be a processor, or vice-versa, and the transmission of data could be a READ operation or a WRITE operation.

Such a method allows a processor/memory interface to recover from errors, thus allowing for higher bandwidth operations than interfaces that are forced to have enough margin to not have errors. In general, for READ and WRITE operations, the signatures are transmitted with the same or very similar latency relative to the read data. Thus, as shown in FIGS. 3 and 4, the memory sends a computed signature to the processor after a fixed number of cycles. Depending upon actual implementation details, this fixed number of cycles could range from 0 to 4 or more cycles. In one embodiment, a number (e.g., four) of dedicated or semi-dedicated input pins are added to the memory device to communicate the signature information. The use of these dedicated pins, e.g., pins 114 in FIG. 1, to transmit the signature information to the processor allows signature information to be transmitted concurrent with or immediately after command and/or data transmission between the memory and the processor, thus reducing the processing overhead and time requirements associated with signature processing.

Embodiments of the error detection method as described and illustrated may be implemented in or used in conjunction with memory controller systems in graphic processing units or microprocessors for use in personal computers, servers, workstations, game consoles, mobile communication devices, personal digital assistants, and any other similar type of computing device. Aspects of the one or more embodiments described herein may be implemented on a computer, or computers executing software instructions. The computer may be a standalone computer or it may be networked in a client-server arrangement or similar distributed computer network. For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and microcontrollers, etc.

The memory associated with the system illustrated in FIG. 1, may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces.

While the term "component" is generally used herein, it is understood that "component" includes circuitry, components, modules, and/or any combination of circuitry, components, and/or modules as the terms are known in the art.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list, and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for systems including graphics processing or video processing or DDR DRAMs as described above.

The various operations described may be performed in a very wide variety of architectures and distributed differently than described. In addition, though many configurations are described herein, none are intended to be limiting or exclusive. The components described are examples of components that could embody the claimed invention. However, alternatives are within the scope of the claims. For example, the processor as shown herein can alternatively be any logic device that provides control functionality to another device with which it communicates. Similarly, the memory device shown could alternatively be any device that communicates data over an interface with a controlling logic device.

In other embodiments, some or all of the hardware and software capability described herein may exist in a printer, a camera, television, a digital versatile disc (DVD) player, a handheld device, a mobile telephone or some other device. The elements and acts of the various embodiments described above can be combined to provide further embodiments. These and other changes can be made to the invention in light of the above detailed description.

In general, in the following claims, the terms used should not be construed to limit the system and method to the specific embodiments disclosed in the specification and the claims, but should be construed to include any processing systems and methods that operate under the claims. Accordingly, the system and method is not limited by the disclosure, but instead the scope of the system and method is to be determined entirely by the claims.

While certain aspects of the system and method are presented below in certain claim forms, the inventors contemplate the various aspects of the system and method in any number of claim forms. For example, while only one aspect of the system and method may be recited as embodied in computer-readable medium, other aspects may likewise be embodied in computer-readable medium. Accordingly, the inventors reserve the right to add additional claims after filing the application to pursue such additional claim forms for other aspects of the system and method for error detection.

What is claimed is:

1. A method, comprising:
   transmitting digital data between a first system component and a second system component over an asymmetrical interface in an application approaching a maximum threshold data rate according to a standard selected from the group consisting of a GDDR standard and a DDR standard, wherein the first component has many logic functions and the second component has minimal logic functions, wherein the asymmetrical interface comprises a shared bus that directly couples the first component and the second component;
   the first component controlling operations of the second component in the asymmetrical interface by,
      receiving a signature from the second component, wherein the signature received corresponds to data transferred in response to a particular command using one line for at least every 8 data bits in the digital data computed by the second component, wherein the signature is received concurrent with the transmission of subsequent commands and data over the interface over dedicated pins, wherein receiving the signature is completed within a threshold period of time for the second component to compute a subsequent signature;
      comparing the signature from the second component to a signature stored in the first component, wherein the signature stored corresponds to the transferred data; and
      determining whether the particular command was executed successfully based on the comparison,
   wherein the first system component is a memory controller and the second system component is a memory approaching a maximum threshold speed according to the standard.

2. The method of claim 1, wherein the command comprises a read command accompanied by an address of the second component from which data is accessed.

3. The method of claim 1, wherein the command comprises a write command accompanied by an address of the second component to which data is written.

4. The method of claim 1, wherein the signature is received in the second component over dedicated pins of the second component.

5. The method of claim 1, wherein the signature received from the second component and the signature stored in the first component both comprise a checksum value.

6. The method of claim 5, wherein the checksum value for each of the signature received from the second component and the signature stored in the first component is generated by a hash function for a cyclic redundancy check process.

7. The method of claim 1, wherein the first component comprises a processor including a memory controller component, and the second component comprises a memory device.

8. The method of claim 7, wherein the processor component comprises at least a portion of a graphics processing unit, and wherein the memory device is selected from the group consisting of DRAM, SRAM, DDR memory, ROM, and disk media.

9. A method, comprising:

transmitting data in response to a particular command from a first component to a second component in an asymmetrical interface in an application approaching a maximum threshold data rate according to a standard selected from the group consisting of a GDDR standard and a DDR standard, wherein the first component has many logic functions and the second component has minimal logic functions, wherein transmitting occurs via the asymmetrical interface that comprises a shared bus that directly couples the first component and the second component;

storing a first signature value computed by the first component in a memory location of the first component, the first signature value derived from the composition of the transmitted data;

receiving the data in the second component;

storing a second signature value in a memory location of the second component, the second signature value derived from the composition of the received data;

transmitting the first signature value to the second component over dedicated signature lines included in the asymmetrical interface concurrent with transmission of a subsequent command from the first component and within a threshold period of time for the first component to compute a subsequent first signature value; and comparing the first signature value to the second signature value to determine the integrity of the received data, wherein the first component is a memory controller and the second component is a memory approaching a maximum threshold speed according to the standard.

10. The method of claim 9, wherein the first signature and the second signature both comprise a checksum value.

11. The method of claim 10, wherein the checksum value for each of the signature received from the second component and the signature stored in the first component is generated by a hash function for a cyclic redundancy check process.

12. The method of claim 9, wherein the first component comprises a processor including a memory controller component, and the second component comprises a memory device.

13. The method of claim 12, wherein the command comprises a read command accompanied by an address of the second component from which data is accessed.

14. The method of claim 12, wherein the command comprises a write command accompanied by an address of the second component to which data is written.

15. A system, comprising:

a first component; and a second component coupled to the first component over an asymmetrical interface, the operations of the second component controlled by the first component in the asymmetrical interface in an application approaching a maximum threshold data rate according to a standard selected from the group consisting of a GDDR standard and a DDR standard, wherein the first component has many logic functions and the second component has minimal logic functions, wherein the asymmetrical interface comprises a shared bus that directly couples the first component and the second component, wherein data is transmitted in response to a particular command from a first component to a second component from the first component to a second component and received in the second component, a first signature value is stored in a memory location of the first component, the first signature value derived from the composition of the transmitted data, a second signature value is stored in a memory location of the second component, the second signature value derived from the composition of the received data, and the first signature value is transmitted to the second component over dedicated signature lines included in the shared bus concurrent with a subsequent command from the first component and is completed within a threshold period of time for the second component to compute a subsequent signature, and compared to the second signature value to determine the integrity of the received data;

wherein at least one of the first signature value and the second signature value uses one line for at least every 8 data bits in the digital data, and wherein the first component is a memory controller and the second component is a memory approaching a maximum threshold speed according to the standard.

16. The system of claim 15, wherein an identical match between the first signature value and the second signature value indicates that the data received is identical to the data transmitted.

17. The system of claim 16, wherein the first signature and the second signature both comprise a checksum value.

18. The system of claim 17, wherein the first component comprises a processor including a memory controller component, and the second component comprises a memory device.

19. The system of claim 18, wherein the command comprises a read command accompanied by an address of the second component from which data is accessed.

20. The system of claim 18, wherein the command comprises a write command accompanied by an address of the second component to which data is written.

21. A method, comprising:

receiving a signature from a component via an asymmetrical interface, wherein the signature received corresponds to data received from the component in response to a first command using one line for at least every 8 data bits in the digital data, and is received over dedicated signature lines included in the asymmetrical interface during transmission of a subsequent command to the component and within a threshold period of time for the component to compute a subsequent signature, wherein the component is one of a first component and a second component such that the asymmetrical interface comprises a shared bus that directly couples the first component and the second component in an application approaching a maximum threshold data rate according to a standard selected from the group consisting of a GDDR standard and a DDR standard, wherein the first component has many logic functions and the second component has minimal logic functions; and responsive to comparing the signature from the component to a stored signature, wherein the stored signature corresponds to the received data, determining using an intelligent device in the asymmetrical interface whether the data received was received without error, wherein the first component is a memory controller and the second component is a memory approaching a maximum threshold speed according to the standard.

22. The method of claim 21, wherein the component comprises a memory device, and further wherein the first command comprises a first read command the data is received in a first read operation from the memory device.

23. The method of claim 22, wherein the subsequent command comprises one of a second read command, and a write command.

24. The method of claim 23, wherein the received signature and the stored signature both comprise a checksum value.

25. A method, comprising:
responsive to data transmitted to a component in response to a first command, receiving a signature from the component over a dedicated signature line during transmission of a subsequent command, the signature corresponding to the transmitted data using one line for at least every 8 data bits in the digital data, wherein receiving the signature is completed within a threshold period of time for the component to compute a subsequent signature, wherein the component is one of a first component and a second component such that the transmitting comprises transmitting via an asymmetrical interface having the dedicated signature line and comprising a shared bus that directly couples the first component and the second component in an application approaching a maximum threshold data rate according to a standard selected from the group consisting of a GDDR standard and a DDR standard, wherein the first component has many logic functions and the second component has minimal logic functions; and
responsive to comparing the received signature to a stored signature, determining using an intelligent device in the asymmetrical interface whether the transmitted data was received by the component without error,
wherein the first component is a memory controller and the second component is a memory approaching a maximum threshold speed according to the standard.

26. The method of claim 25, wherein the component comprises a memory device, and further wherein first command comprises a first write command and the data is transmitted in a first write operation to the memory device.

27. The method of claim 26, wherein the subsequent command comprises one of a second write command, and a read command.

28. The method of claim 27, wherein the received signature and the stored signature both comprise a checksum value.

29. A method, comprising:
receiving in first command a request for data from a component, wherein the component is one of a first component and a second component such that receiving comprises transmission via an symmetrical interface that comprises a shared bus that directly couples the first component and the second component in an application approaching a maximum threshold data rate according to a standard selected from the group consisting of a GDDR standard and a DDR standard, wherein the first component has many logic functions and the second component has minimal logic functions, and the first component controlling operations of the second component in the asymmetrical interface; and
responsive to the request, transmitting to the component, data and a signature corresponding to the data, the signature transmitted to the component over dedicated signature lines included in the asymmetrical interface during transmission of a subsequent command from the component using one line for at least every 8 data bits in the digital data, wherein receiving the signature is completed within a threshold period of time for the component to compute a subsequent signature,
wherein the first component is a memory controller and the second component is a memory approaching a maximum threshold speed according to the standard.

30. The method of claim 29, wherein the component comprises a memory controller, and further wherein the first command comprises a first read command, and the data is transmitted in a first read operation.

31. The method of claim 30, wherein the subsequent command comprises one of a second read command, and a write command.

32. The method of claim 31, wherein the signature comprises a checksum value based on the content of the data.

33. A method, comprising:
receiving data transmitted from a component in response to a first command transmitted to the component, wherein the component is one of a first component and a second component such that receiving comprises receiving via an asymmetrical interface comprises a shared bus that directly couples the first component and the second component in an application approaching a maximum threshold data rate according to a standard selected from the group consisting of a GDDR standard and a DDR standard, wherein the first component has many logic functions and the second component has minimal logic functions, and the first component controlling operations of the second component in the asymmetrical interface; and
responsive to the received data, transmitting over a dedicated signature line within the asymmetrical interface to the component a signature corresponding to the received data using one line for at least every 8 data bits in the digital data, wherein receiving the signature is completed within a threshold period of time for the component to compute a subsequent signature,
wherein the first component is a memory controller and the second component is a memory approaching a maximum threshold speed according to the standard.

34. The method of claim 33, wherein the component comprises a memory controller, and further wherein the first command comprises a first write command, and the data is transmitted in a first write operation.

35. The method of claim 34, wherein the subsequent command comprises one of a second write command, and a read command.

36. The method of claim 35, wherein the signature comprises a checksum value based on the content of the data.

37. A method, comprising:
transmitting digital data between a first system component and a second system component over an asymmetrical interface in an application approaching a maximum threshold data rate according to a memory standard, wherein the first component has many logic functions and the second component has minimal logic functions, wherein the asymmetrical interface comprises a shared bus that directly couples the first component and the second component;
the first component controlling operations of the second component in the asymmetrical interface by,
receiving a signature from the second component, wherein the signature received corresponds to data transferred in response to a particular command using one line for at least every 8 data bits in the digital data computed by the second component, wherein the signature is received concurrent with the transmission of subsequent commands and data over the interface over dedicated pins, wherein receiving the signature is completed within a threshold period of time for the second component to compute a subsequent signature;

comparing the signature from the second component to a signature stored in the first component, wherein the signature stored corresponds to the transferred data; and determining whether the particular command was executed successfully based on the comparison, wherein the first system component is a memory controller and the second system component is a memory approaching a maximum threshold speed according to the memory standard.

38. The method of claim 37, wherein the memory standard is selected from the group consisting of a GDDR standard and a DDR standard.

* * * * *